United States Patent
Wang et al.

(10) Patent No.: US 10,449,630 B2
(45) Date of Patent: Oct. 22, 2019

(54) INVISIBLE LASER SYSTEM AND OPTICAL PATH VISUALIZATION METHOD THEREOF

(71) Applicants: BOE TECHNOLOGY GROUP CO., LTD., Beijing (CN); HEFEI XINSHENG OPTOELECTRONICS TECHNOLOGY CO., LTD., Hefei, Anhui (CN)

(72) Inventors: Haiping Wang, Beijing (CN); Dong Guo, Beijing (CN); Hong Qiang, Beijing (CN); Xu Yan, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 0 days.

(21) Appl. No.: 15/108,272

(22) PCT Filed: Dec. 14, 2015

(86) PCT No.: PCT/CN2015/097233
§ 371 (c)(1),
(2) Date: Jun. 24, 2016

(87) PCT Pub. No.: WO2017/024709
PCT Pub. Date: Feb. 16, 2017

(65) Prior Publication Data
US 2017/0225267 A1    Aug. 10, 2017

(30) Foreign Application Priority Data
Aug. 11, 2015   (CN) .......................... 2015 1 0488336

(51) Int. Cl.
*G02B 27/10*   (2006.01)
*G02B 27/12*   (2006.01)
(Continued)

(52) U.S. Cl.
CPC ............ *B23K 26/02* (2013.01); *B23K 26/042* (2015.10); *B23K 26/0608* (2013.01);
(Continued)

(58) Field of Classification Search
CPC . G02B 26/0816; G02B 27/283; G02F 1/1303; B23K 26/02
(Continued)

(56) References Cited

U.S. PATENT DOCUMENTS

| 4,391,519 A | 7/1983 | Kuwabara et al. |
| 6,392,801 B1 * | 5/2002 | Southwell ............. G02B 5/289 |
| | | 359/485.03 |

(Continued)

FOREIGN PATENT DOCUMENTS

| CN | 101004483 | 7/2007 |
| CN | 201131794 | 10/2008 |

(Continued)

OTHER PUBLICATIONS

Office Action in Chinese Application No. 201510488336.1 dated Aug. 1, 2017, with English translation.
(Continued)

*Primary Examiner* — Collin X Beatty
(74) *Attorney, Agent, or Firm* — Womble Bond Dickinson (US) LLP

(57) ABSTRACT

An invisible laser system and an optical path visualization method thereof are disclosed. The invisible laser system comprises an invisible laser light generator for generating invisible laser light; a visible light generator for generating visible light; and an optical path visualization component arranged in optical paths of the invisible and visible light, and comprising a first and second incident end and a first outgoing end. The invisible laser light is incident on the first incident end, and the visible light is incident on the second
(Continued)

incident end. All of the invisible laser light and at least part of the visible light are emitted in parallel with each other at the first outgoing end. All of the invisible laser light is present in a direction parallel with the optical path of the visible light, and no invisible laser light is present in other directions, so radiation risks are eliminated.

2 Claims, 2 Drawing Sheets

(51) Int. Cl.
G02B 26/08 (2006.01)
G02B 27/28 (2006.01)
G02F 1/13 (2006.01)
B23K 26/02 (2014.01)
B23K 26/06 (2014.01)
B23K 26/38 (2014.01)
B23K 26/402 (2014.01)
C03B 33/02 (2006.01)
C03B 33/09 (2006.01)
B23K 26/042 (2014.01)
B23K 103/00 (2006.01)

(52) U.S. Cl.
CPC ...... B23K 26/0613 (2013.01); B23K 26/0652 (2013.01); B23K 26/38 (2013.01); B23K 26/402 (2013.01); C03B 33/0222 (2013.01); C03B 33/091 (2013.01); G02B 26/0816 (2013.01); G02B 27/1006 (2013.01); G02B 27/126 (2013.01); G02B 27/283 (2013.01); *B23K 2103/54* (2018.08); *G02F 1/1303* (2013.01)

(58) Field of Classification Search
USPC .................................................. 359/489.07
See application file for complete search history.

(56) References Cited

U.S. PATENT DOCUMENTS

| 6,550,917 | B1* | 4/2003 | Neal | A61B 3/158 |
| | | | | 351/221 |
| 6,867,753 | B2* | 3/2005 | Chinthammit | G06F 3/011 |
| | | | | 345/8 |
| 6,985,293 | B2* | 1/2006 | Yoo | G02B 27/0944 |
| | | | | 359/1 |
| 2009/0041062 | A1* | 2/2009 | Liu | G02B 6/4215 |
| | | | | 372/6 |
| 2012/0257212 | A1* | 10/2012 | Okikawa | A61B 3/102 |
| | | | | 356/479 |
| 2014/0187879 | A1 | 7/2014 | Wood et al. | |
| 2016/0223819 | A1* | 8/2016 | Liu | G02B 27/0172 |

FOREIGN PATENT DOCUMENTS

| CN | 102353465 | 2/2012 |
| CN | 202554108 | 11/2012 |
| CN | 103323957 | 9/2013 |
| CN | 203275699 U | 11/2013 |
| CN | 103682952 | 3/2014 |
| CN | 103713797 | 4/2014 |
| CN | 103713797 A | 4/2014 |
| CN | 103792673 | 5/2014 |
| CN | 204165890 | 2/2015 |
| CN | 104993357 | 10/2015 |
| EP | 0131768 | 1/1985 |
| EP | 0624422 | 11/1994 |
| JP | H10173258 | 6/1998 |
| JP | H 10173258 A | 6/1998 |

OTHER PUBLICATIONS

International Search Report and Written Opinion with English Language Translation, dated Apr. 28, 2016, Application No. PCT/CN2015/097233.
"Second Office Action," CN Application No. 201510488336.1 (dated Feb. 8, 2018).
"Extended European Search Report," EP Application No. 15868681.6 (dated Mar. 25, 2019).

* cited by examiner

INVISIBLE LASER SYSTEM AND OPTICAL PATH VISUALIZATION METHOD THEREOF

RELATED APPLICATIONS

The present application is the U.S. national phase entry of PCT/CN2015/097233, with an international filing date of Dec. 14, 2015, which claims the benefit of Chinese Patent Application No. 201510488336.1, filed on Aug. 11, 2015, the entire disclosures of which are incorporated herein by reference.

TECHNICAL FIELD

Embodiments of this disclosure relate to the field of laser techniques, and specifically to an invisible laser system and an optical path visualization method thereof.

BACKGROUND

Invisible lasers are widely applied in the field of device processing and others. For instance, in a manufacture process of a liquid crystal display (LCD), an invisible laser such as a Nd:YAG laser (with a wavelength of 1.064 μm) and a $CO_2$ laser (with a wavelength of 10.6 μm) is often used for cutting glass substrates, repairing display panels, disconnecting lines and fabricating polysilicon active layers. There is a need for engineering personnel to debug the laser in case of laser installation and processing defects. However, as the laser light emitted by such a laser is invisible, it brings inconveniences and radiation risks to the engineering personnel when debugging the laser.

FIG. 1 shows a schematic view of an invisible laser system 100. Invisible laser light 111 emitted by an invisible laser light generator 110 passes through a laser light adjusting component 120 and then impinges on a surface of an object to be processed 130. The laser light adjusting component 120 is used for adjusting the traveling direction, divergence angle, beam spot shape and the like of the laser light. It can comprise a deflecting unit, a beam expanding telescope (BET), a condensing lens, a beam spot shape controlling unit, a focusing lens and so on. It is usually required that the invisible laser light 111 is perpendicular to a horizontal surface of each lens in its optical path. To this end, the engineering personnel generally adopt an infrared viewer (IR-Viewer) for viewing and debugging the optical path of the invisible laser light 111. However, such IR-Viewer cannot view and debug the entire optical path, but can only view a certain point in the optical path. The debugging procedure consumes much time and involves relatively higher radiation risks.

Therefore, there is a need of an improved invisible laser system in this field.

SUMMARY

This disclosure proposes an invisible laser system and an optical path visualization method thereof so as to alleviate or solve one or more of the problems mentioned above. Specifically, the invisible laser system and the optical path visualization method thereof according to this disclosure can completely eliminate the radiation risks of invisible laser light during the debugging process.

In a first aspect, this disclosure provides an invisible laser system, comprising: an invisible laser light generator for generating invisible laser light; and a visible light generator for generating visible light. The invisible laser system further comprises: an optical path visualization component, wherein the optical path visualization component comprises a first incident end, a second incident end, and a first outgoing end, wherein the invisible laser light is incident on the first incident end, the visible light is incident on the second incident end, and all of the invisible laser light and at least part of the visible light are emitted in parallel with each other at the first outgoing end.

According to this disclosure, all of the invisible laser light is only present in a direction parallel with the optical path of the visible light, and no invisible laser light is present in other directions, so the radiation risks are completely eliminated. In the invisible laser system, the optical path of the invisible laser light is always visualized such that the engineering personnel can always conveniently and intuitionally debug the optical path of the invisible laser light, thereby avoiding the blindness of a reference-object-absent debugging of the invisible laser light during the debugging process, and increasing the efficiency of the debugging of the invisible laser light. Moreover, since all of the invisible laser light is guided onto the surface of the object to be processed, the introduction of the optical path visualization component does not influence the intensity of the invisible laser light, i.e., the device processing performance of the invisible laser system is not negatively affected at all.

For example, a frequency doubling crystal is used for introducing visible light in an invisible optical path of an invisible laser for marking the invisible optical path. For another example, a visible light source and a beam splitter are introduced into the invisible optical path, and the visible light of the visible light source is reflected into the invisible optical path of the laser by the beam splitter. However, both approaches have defects. In case that a frequency doubling crystal is used, only during the optical path debugging, is the frequency doubling crystal located in the invisible optical path of the invisible laser. When the frequency doubling crystal is moved out of the invisible optical path, the optical path of the laser is still invisible, hence potentially poses radiation risks. In case that a visible light source and a beam splitter are used, the beam splitter divides the invisible optical path of the invisible laser into two, and the visible light is only introduced into either of the two invisible optical paths while the other invisible optical path will potentially pose radiation risks. In other words, radiation risks exist in both situations.

The optical path visualization component can comprise a total reflection prism (TRP) which has a first side, a second side perpendicular to the first side and a ramp, wherein the first side forms the first incident end, the ramp forms the second incident end and the second side forms the first outgoing end.

According to this disclosure, the total reflection prism is used for implementing the optical path visualization component. By means of the total internal reflection of the light inside the total reflection prism, the invisible laser light is deflected to be parallel with the visible light, and thereby one goal of this disclosure is achieved.

The invisible laser light can be vertically incident on the first side of the total reflection prism, totally reflected on the ramp, and vertically emitted at the second side; and the visible light can be incident on the ramp of the total reflection prism and vertically emitted on the second side.

According to this disclosure, the invisible laser light is vertically incident on the first side of the total reflection prism, totally and internally reflected on the ramp, and vertically emitted on the second side, such that all of the invisible laser light is guided onto the surface of the object to be processed. Meanwhile, the visible light is incident on the ramp of the total reflection prism, wherein the incident angle is tuned to make the visible light achieves a refraction angle of 45 degrees on the ramp and thus is vertically emitted on the second side. Thereby, all of the invisible laser light and at least part of the visible light are vertically emitted on the second side and guided in parallel onto the surface of the object to be processed, and thereby one goal of this disclosure is achieved.

The optical path visualization component can comprise a polarized beam splitter (PBS, also called as a polarized beam splitting prism). The polarized beam splitter can be formed by bonding a first right-angled prism and a second right-angled prism. The first right-angled prism has a first side, a second side perpendicular to the first side and a ramp. The second right-angled prism has a third side, a fourth side perpendicular to the third side and a ramp. The ramp of the first right-angled prism and the ramp of the second right-angled prism are bonded with each other, the first side is opposite to the third side, and the second side is opposite to the fourth side. The first side forms the first incident end, the fourth side forms the second incident end, and the second side forms the first outgoing end.

According to this disclosure, the polarized beam splitter is used for implementing the optical path visualization component. When the incident laser light is a polarized light, the polarized beam splitter divides the incident light into two polarized lights perpendicular to each other. By suitably adjusting the relative orientation of the incident light and the polarized beam splitter, all of the incident laser light can be deflected to be parallel with the emitted visible light, and thereby one goal of this disclosure is achieved.

The invisible laser light can be vertically incident on the first side of the first right-angled prism, totally reflected on an interface of the ramp of the first right-angled prism and the ramp of the second right-angled prism, and vertically emitted on the second side; and the visible light can be vertically incident on the fourth side, and at least partially emitted vertically on the second side.

According to this disclosure, when the invisible laser light is a linearly polarized light and vertically incident on the first side of the first right-angled prism, by adjusting an angle enclosed between a polarization direction of the invisible laser light and an optical axis of the first right-angled prism, all of the invisible laser light is totally reflected at the interface of the ramp of the first right-angled prism and the ramp of the second right-angled prism, and vertically emitted on the second side of the first right-angled prism in the form of an S polarized light. Meanwhile, the visible light is vertically incident on the fourth side of the second right-angled prism, and thus vertically and at least partially emitted on the second side, and thereby one goal of this disclosure is achieved.

The optical path visualization component can further comprise a phase retarder which is arranged at the upstream of the first incident end of the optical path visualization component.

According to this disclosure, when the invisible laser light is a circularly polarized light or an elliptically polarized light, the phase retarder can be arranged at the upstream of the first incident end of the optical path visualization component, to introduce a phase difference between two polarization components of the invisible laser light and convert the invisible laser light into a linearly polarized light before it is incident on the first right-angled prism, such that all of the invisible laser light is emitted via the second side of the first right-angled prism after being reflected at the interface of the two ramps. It should be pointed out that the expression of "which (i.e. the phase retarder) is arranged at the upstream of the first incident end of the optical path visualization component" here means that the phase retarder is arranged at the upstream of the first incident end of the optical path visualization component in the optical path of the invisible laser light. That is, the invisible laser light is incident on the optical path visualization component after passing through the phase retarder. The phase retarder can be arranged abutting on the optical path visualization component, with no other optics settled between both of them. Of course, other optics can also be present between the phase retarder and the optical path visualization component.

The phase retarder can be a quarter wave plate.

According to this disclosure, the phase retarder can be a quarter wave plate. After the circularly polarized light or the elliptically polarized light passes through the quarter wave plate, an additional phase difference of $\pi/2$ is generated between two polarization components, and the circularly polarized light or the elliptically polarized light is converted into a linearly polarized light.

The optical path visualization component can further comprise a polarizer which is arranged at the upstream of the second incident end of the optical path visualization component.

According to this disclosure, the polarizer can be arranged at the upstream of the second incident end of the optical path visualization component, to convert the visible light into a polarized light, such that most or all of the visible light can be emitted via the second side of the first right-angled prism. The polarizer can be, for instance, a polaroid or a Nicol prism.

All of the invisible laser light and at least part of the visible light can be emitted coaxially at the first outgoing end of the optical path visualization component.

According to this disclosure, by adjusting an incident position of the invisible laser light at the first incident end and an incident position of the visible light at the second incident end, the invisible laser light and the visible light can coincide in an outgoing position at the first outgoing end. Thereby, the optical paths of the invisible laser light and the visible light emitted from the first outgoing end are coaxial, which provides the engineering personnel with more direct and more intuitional visualized effects.

The optical path visualization component can further comprise a tunable slit which is arranged at the downstream of the first outgoing end of the optical path visualization component.

According to this disclosure, the tunable slit can be arranged at the downstream of the first outgoing end of the optical path visualization component. Thereby, beam shapes and sizes of the emitted invisible laser light and the visible light can be adjusted upon needs. Besides, the beam size of the visible light can be adjusted to be the same as that of the invisible laser light. It should be pointed out that the expression of "which (i.e. the tunable slit) is arranged at the downstream of the first outgoing end of the optical path visualization component" here means that the tunable slit is arranged at the downstream of the first outgoing end of the optical path visualization component in the optical path of the invisible laser light. That is, the invisible laser light and the visible light pass through the tunable slit after being emitted from the optical path visualization component. The tunable slit can be arranged abutting on the optical path visualization component, with no other optics settled between both of them. Of course, other optics can also be present between the optical path visualization component and the tunable slit.

Either or both of the visible light generator and the optical path visualization component can be integrated in the invisible laser light generator.

According to this disclosure, the visible light generator and/or the optical path visualization component can be integrated in the invisible laser light generator. This benefits the realization of a compact and minimized invisible laser system. When the visible light generator and the optical path visualization component are both integrated in the invisible laser light generator, the invisible laser light generator itself has a function of optical path visualization.

The visible light can be a visible laser light or a visible natural light.

According to this disclosure, the visible light generator generates visible light which can be a laser light or a natural light, and the natural light can be single-wavelength light, discrete multiple-wavelength light, or continuous-wavelength light.

In a second aspect, this disclosure provides an optical path visualization method of an invisible laser system. The invisible laser system comprises: an invisible laser light generator for generating invisible laser light; a visible light generator for generating visible light; and an optical path visualization component, wherein the optical path visualization component is arranged in the optical path of the invisible laser light and the optical path of the visible light. The method comprises a step of: adjusting the invisible laser light generator, the visible light generator and the optical path visualization component, such that all of the invisible laser light and at least part of the visible light are guided as outgoing beams in parallel with each other.

The optical path visualization component can comprise a total reflection prism, and the step can comprise:

adjusting the invisible laser light to be vertically incident on the first side of the total reflection prism, totally reflected on the ramp and vertically emitted on the second side; and adjusting the visible light to be incident on the ramp of the total reflection prism and vertically emitted on the second side.

The optical path visualization component can comprise a polarized beam splitter formed by bonding a first right-angled prism and a second right-angled prism, and the step can comprise:

adjusting the invisible laser light to be vertically incident on the first side of the first right-angled prism, totally reflected on an interface of the ramp of the first right-angled prism and the ramp of the second right-angled prism, and vertically emitted on the second side of the first right-angled prism; and adjusting the visible light to be vertically incident on a side of the second right-angled prism opposite to the second side of the first right-angled prism, and vertically and at least partially emitted on the second side of the first right-angled prism.

The step can comprise: adjusting the invisible laser light generator, the visible light generator and the optical path visualization component such that all of the invisible laser light and at least part of the visible light are guided to be emitted coaxially.

The optical path visualization method according to this disclosure has benefits which are identical or similar to the invisible laser system mentioned above, so no more details shall be given here.

In this disclosure, a visible light generator and an optical path visualization component are introduced into a known invisible laser system such that all of the invisible laser light and at least part of the visible light are emitted in parallel with each other at a first outgoing end of the optical path visualization component. Since all of the invisible laser light is only present in a direction parallel with the optical path of the visible light, and no invisible laser light is present in other directions, so the radiation risks are completely eliminated.

In the invisible laser system, the optical path of the invisible laser light is always visualized such that the engineering personnel can always conveniently and intuitionally debug the optical path of the invisible laser light, thereby avoiding blindness of a reference-object-absent debugging of the invisible laser light during the debugging process and increasing the efficiency of the debugging of the invisible laser light. Moreover, since all of the invisible laser light is guided onto the surface of the object to be processed, it makes the introduction of the optical path visualization component does not influence the intensity of the invisible laser light, i.e., the device processing performance of the invisible laser system is not negatively affected at all.

BRIEF DESCRIPTION OF DRAWINGS

In order to render the goals, the technical solutions and the advantages of the embodiments of this disclosure clearer, the technical solutions of each embodiment shall be described clearly and completely in the following text with reference to the drawings. Apparently, the described embodiments are only a part of the embodiments of this disclosure, rather than all of them. Based on the described embodiments of this disclosure, all other embodiments obtainable by a person having ordinary skills in the art without inventive efforts shall fall within the protection scope of this disclosure.

DETAILED DESCRIPTION OF EMBODIMENTS

Specific embodiments of the invisible laser system and the optical path visualization method thereof of this disclosure shall be described in detail as follows with reference to the drawings. Each of the drawings of this disclosure schematically show structures, parts and/or steps related to the inventive point, but do not show or only partially show structures, parts and/or steps unrelated to the inventive point.

REFERENCE SIGNS 100, 200 invisible laser system;
110, 210 invisible laser light generator;
111, 211, 212 invisible laser light;
120, 220 laser light adjusting component;
130, 230 object to be processed;

240 visible light generator;
241, 242 visible light;
250, 300, 400, 500 optical path visualization component;
310, 410 total reflection prism;
420, 520 tunable slit;
510 polarized beam splitter;
530 phase retarder;
540 polarizer;
θ1 incident angle of the visible light;
θ2 refraction angle of the visible light.

Figure 1:
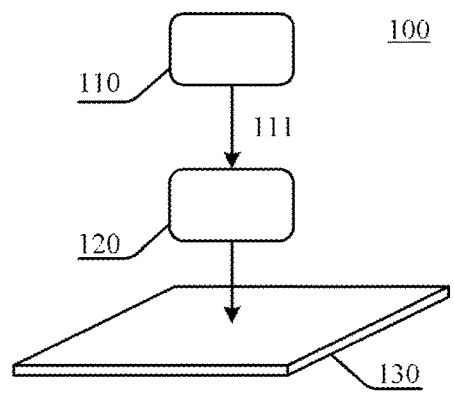
FIG. 1 is a schematic view of a known invisible laser system.
Figure 2:
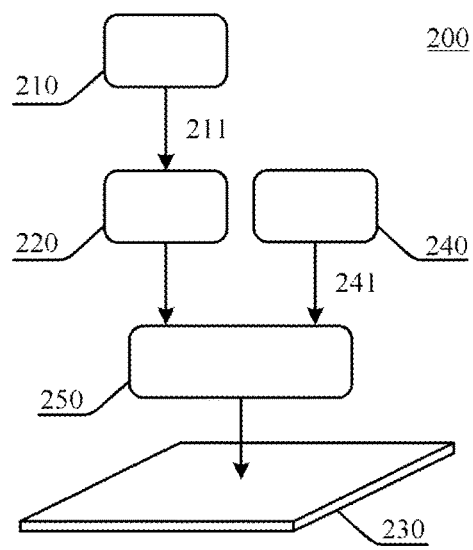
FIG. 2 is a schematic view of an invisible laser system according to one embodiment of this disclosure.

FIG. 2 shows a schematic view of an invisible laser system 200 of one embodiment of this disclosure. Invisible laser light 211 emitted by an invisible laser light generator 210 passes through a laser light adjusting component 220 and then impinges on a surface of an object to be processed 230.

The invisible laser system 200 further comprises a visible light generator 240. The visible light generator 240 generates visible light 241. The visible light 241 can be either a visible laser light or a visible natural light. The visible natural light can be single-wavelength light, discrete multiple-wavelength light, or continuous-wavelength light.

The invisible laser system 200 further comprises an optical path visualization component 250. The optical path visualization component 250 is arranged in an optical path of the invisible laser light 211 and an optical path of the visible light 241. The optical path visualization component 250 comprises a first incident end, a second incident end and a first outgoing end. The invisible laser light 211 is incident on the first incident end, the visible light 241 is incident on the second incident end, and all of the invisible laser light 211 and at least part of the visible light 241 are emitted in parallel with each other at the first outgoing end. Since the optical path of the invisible laser light 211 is parallel with the optical path of the visible light 241, the visible light 241 can be used as a reference guiding light which enables the engineering personnel to easily locate the optical path of the invisible laser light 211, i.e., the optical path of the invisible laser light 211 is "visualized".

In FIG. 2, the optical path visualization component 250 is schematically shown as being arranged at the downstream of the laser light adjusting component 220 in the optical path of the invisible laser light 211. Of course, the optical path visualization component 250 can also be arranged at the upstream of the laser light adjusting component 220 in the optical path of the invisible laser light 211 or be arranged between each optics comprised in the laser light adjusting component 220.

Either or both of the visible light generator 240 and the optical path visualization component 250 can be settled in the invisible laser light generator 210. This benefits the realization of a compact and minimized invisible laser system 200.

Exemplary embodiments of the optical path visualization component 250 shall be described in detail as follows with reference to FIGS. 3, 4 and 5.

Figure 3:
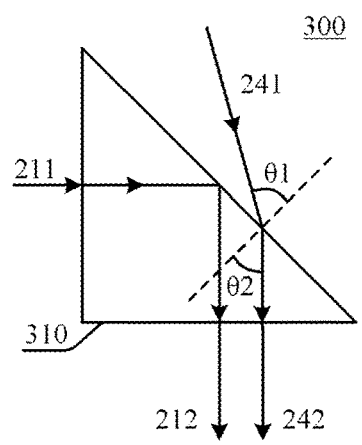
FIG. 3 is a schematic view of an optical path visualization component according to one embodiment of this disclosure.

FIG. 3 schematically shows an optical path of an optical path visualization component 300. In this embodiment, the optical path visualization component 300 comprises a total reflection prism 310. The total reflection prism 310 has a first side, a second side perpendicular to the first side and a ramp. The first side forms a first incident end of the optical path visualization component 300, the ramp forms a second incident end and the second side forms a first outgoing end.

The invisible laser light 211 is vertically incident on the first side of the total reflection prism 310, totally reflected on the ramp, and vertically emitted on the second side. The visible light 241 is incident on the ramp of the total reflection prism. An incident angle θ1 of the visible light 241 on the ramp of the total reflection prism 310 is tuned, and thereby a refraction angle θ2 of the visible light 241 is tuned, such that the visible light 241 is vertically emitted on the second side. As shown in FIG. 3, an invisible laser light 212 and a visible light 242, which are emitted from the second side of the total reflection prism 310, are parallel with each other.

Figure 4:
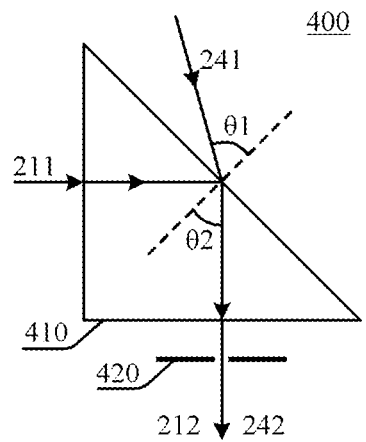
FIG. 4 is a schematic view of an optical path visualization component according to one embodiment of this disclosure.

FIG. 4 schematically shows an optical path of an optical path visualization component 400. In this embodiment, the optical path visualization component 400 comprises a total reflection prism 410. The invisible laser light 211 is vertically incident on a first side of the total reflection prism 410, totally reflected on a ramp, and vertically emitted on a second side. The visible light 241 is incident on the ramp of the total reflection prism. An incident angle θ1 of the visible light 241 on the ramp of the total reflection prism 410 is tuned, and thereby a refraction angle θ2 of the visible light 241 is tuned such that the visible light 241 is vertically emitted on the second side.

Unlike the embodiment of FIG. 3, in the embodiment as show in FIG. 4, all of the invisible laser light 211 and at least part of the visible light 241 are emitted coaxially at the first outgoing end of the optical path visualization component. To be more specific, by adjusting an incident position of the invisible laser light 211 on the first side and an incident position of the visible light 241 on the ramp, the invisible laser light 211 and the visible light 241 can coincide at an outgoing position on the second side. As shown in FIG. 4, the invisible laser light 212 and the visible light 242 emitted from the second side of the total reflection prism 410 coincide with each other. Thereby, the optical paths of the invisible laser light 212 and the visible light 242 emitted from the first outgoing end are coaxial, which provides the engineering personnel with more direct and more intuitional visualized effects, thereby may further saving the debugging time of the engineering personnel and further reducing the radiation risks.

As shown in FIG. 4, the optical path visualization component 400 can further comprise a tunable slit 420. The tunable slit 420 can be arranged at the downstream of the second side of the total reflection prism 410 in the optical path of the invisible laser light 211. With the tunable slit 420, beam shapes and sizes of the emitted invisible laser light 212 and the visible light 242 can be adjusted upon needs. Besides, the beam size of the emitted visible light 242 can be adjusted to be the same as that of the invisible laser light 212.

In the embodiments as shown in FIGS. 3 and 4, all of the invisible laser light 211 is totally and internally reflected on the ramps of the total reflection prisms 310 and 410, and vertically emitted on the second sides, such that all of the invisible laser light 211 is guided onto the surface of the object to be processed 230. Meanwhile, the visible light 241 is vertically emitted on the second sides of the total reflection prisms 310 and 410. Thereby, all of the invisible laser light 211 and at least part of the visible light 241 are vertically emitted on the second side and guided in parallel onto the surface of the object to be processed, and thereby the radiation risks are eliminated.

Figure 5:
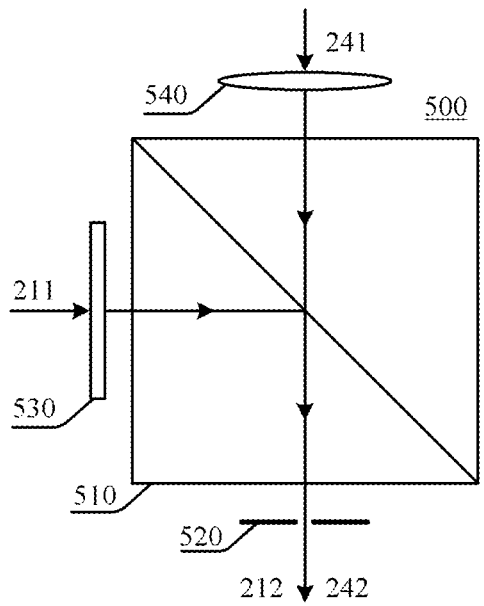
FIG. 5 is a schematic view of an optical path visualization component according to one embodiment of this disclosure.

FIG. 5 schematically shows an optical path of an optical path visualization component 500. In this embodiment, the optical path visualization component 500 comprises a polarized beam splitter 510. The polarized beam splitter 510 is represented in FIG. 5 using a cross-sectional view. As is known in the art, the polarized beam splitter 510 is usually formed by bonding a first right-angled prism and a second right-angled prism. The first right-angled prism has a first side, a second side perpendicular to the first side and a ramp. The second right-angled prism has a third side, a fourth side perpendicular to the third side and a ramp. The ramp of the first right-angled prism and the ramp of the second right-angled prism are bonded with each other, the first side is opposite to the third side, and the second side is opposite to the fourth side. The first side forms the first incident end, the fourth side forms the second incident end, and the second side forms the first outgoing end.

The invisible laser light 211 is vertically incident on the first side of the first right-angled prism, totally reflected on an interface of the ramp of the first right-angled prism and the ramp of the second right-angled prism, and vertically emitted on the second side. The visible light 241 is vertically incident on the fourth side, and vertically and at least partially emitted on the second side. As shown in FIG. 5, the invisible laser light 212 and the visible light 242 emitted from the second side of the polarized beam splitter 510 coincide with each other.

In the embodiment as shown in FIG. 5, by adjusting an angle between a polarization direction of the invisible laser light 211 and an optical axis of the first right-angled prism, all of the invisible laser light 211 is totally reflected at the interface of the ramp of the first right-angled prism and the ramp of the second right-angled prism, and vertically emitted on the second side of the first right-angled prism in the form such as an S polarized light. Meanwhile, the visible light 241 is vertically incident on the fourth side of the second right-angled prism, and thus vertically and at least partially emitted on the second side, and guided in parallel or coaxially onto the surface of the object to be processed. Thereby, the radiation risks are eliminated completely.

Similar to the embodiment as shown in FIG. 4, the optical path visualization component 500 can further comprise a tunable slit 520. The tunable slit 520 can be arranged at the downstream of the second side of the first right-angled prism in the polarized beam splitter 510. With the tunable slit 520, the beam shapes and sizes of the emitted invisible laser light 212 and the emitted visible light 242 can be adjusted upon needs, and the beam size of the visible light 242 can be adjusted to be the same as that of the invisible laser light 212.

As shown in FIG. 5, the optical path visualization component 500 can further comprise a phase retarder 530. The phase retarder 530 is arranged at the upstream of the first side of the first right-angled prism in the polarized beam splitter 510, in the optical path of the invisible laser light 211. When the invisible laser light 211 is a circularly polarized light or an elliptically polarized light, the phase retarder 530 can introduce a phase difference between two polarization components of the invisible laser light 211. The invisible laser light 211 is converted into a linearly polarized light before it is incident on the polarized beam splitter 510 such that all of the invisible laser light 211 is emitted via the second side of the first right-angled prism after being reflected at the interface of the two ramps of the polarized beam splitter 510.

In an exemplary embodiment, the phase retarder 530 can be a quarter wave plate. After the circularly polarized light or the elliptically polarized light passes through the quarter wave plate, an additional phase difference of $\pi/2$ is generated between two polarization components, such that the circularly polarized light or the elliptically polarized light is converted into a linearly polarized light.

As shown in FIG. 5, the optical path visualization component can further comprise a polarizer 540. The polarizer 540 is arranged at the upstream of the second incident end of the optical path visualization component 510, converts the visible light 241 into a polarized light such that most or all of the visible light can be emitted via the second side of the first right-angled prism in the polarized beam splitter 510.

Figure 6:
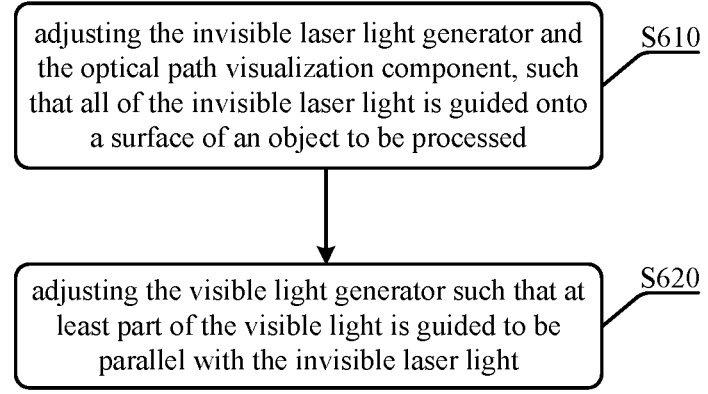
FIG. 6 is a flowchart of an optical path visualization component according to one embodiment of this disclosure.

This disclosure further comprises an optical path visualization method of an invisible laser system. The invisible laser system comprises: an invisible laser light generator for generating invisible laser light; a visible light generator for generating visible light; and an optical path visualization component, wherein the optical path visualization component is arranged in an optical path of the invisible laser light and an optical path of the visible light. As shown in the flowchart of FIG. 6, the method comprises steps of: adjusting the invisible laser light generator and the optical path visualization component, such that all of the invisible laser light is guided onto a surface of an object to be processed; and adjusting the visible light generator such that at least part of the visible light is guided to be parallel with the invisible laser light.

It should be pointed out that the sequence of the step of adjusting the invisible laser light generator and the optical path visualization component and the step of adjusting the visible light generator is not limited to what is mentioned above. For instance, the visible light generator can be adjusted such that the visible light is guided, along a specific optical path, onto the surface of the object to be processed, and then the invisible laser light generator and the optical path visualization component are adjusted such that all of the invisible laser light is guided, in a direction parallel with the visible light, onto the surface of the object to be processed.

It should be further pointed out that description such as "adjusting the invisible laser light generator and the optical path visualization component" means adjusting a relative spatial orientation of the invisible laser light generator and the optical path visualization component. In other words, it is possible to either adjust only one of the invisible laser light generator and the optical path visualization component, or adjust both the invisible laser light generator and the optical path visualization component when needed.

In an exemplary embodiment, the optical path visualization component comprises a total reflection prism. In this embodiment, the step of adjusting the invisible laser light generator and the optical path visualization component comprises: adjusting the invisible laser light to be vertically incident on a first side of the total reflection prism, totally reflected on a ramp and vertically emitted on a second side. Meanwhile, the step of adjusting the visible light generator comprises: adjusting the visible light to be incident on the ramp of the total reflection prism and vertically emitted on the second side.

In an exemplary embodiment, the optical path visualization component comprises a polarized beam splitter formed by bonding a first right-angled prism and a second right-angled prism. In this embodiment, the step of adjusting the invisible laser light generator and the optical path visualization component comprises: adjusting the invisible laser light to be vertically incident on a first side of the first right-angled prism, totally reflected on an interface of a ramp of the first right-angled prism and a ramp of the second right-angled prism, and vertically emitted on a second side of the first right-angled prism. Meanwhile, the step of adjusting the visible light generator comprises: adjusting the visible light to be vertically incident on a side of the second right-angled prism which is opposite to the second side of the first right-angled prism, and vertically and at least partially emitted on the second side of the first right-angled prism.

In an exemplary embodiment, the step of adjusting the visible light generator comprises: adjusting the visible light generator such that at least part of the visible light is guided to be coaxial with the invisible laser light.

The above descriptions of the embodiments of this disclosure are only provided for illustrative and explanatory purposes. They are not intended to be exhaustive or to limit the content of this disclosure. Therefore, the person having ordinary skill in the art will easily conceive of many adjustments and variations. For example, in the above descriptions, the invisible laser system and the optical path visualization method thereof of this disclosure are described in detail with a total reflection prism and a polarized beam splitter serve as an example of optical path visualization component. However, the person having ordinary skill in the art shall understand that the optical path visualization component of this disclosure is not limited to the total reflection prism and the polarized beam splitter mentioned above. Any optics or combinations thereof, which is capable of guiding all of the invisible laser light and at least part of the visible light to be output beams parallel or coinciding with each other, can be used for implementing the optical path visualization component according to this disclosure. For example, the optical path visualization component can also be implemented by other prism combinations. Therefore, the scope of this disclosure shall be defined by the appended claims.

What is claimed is:

1. An optical path visualization method of an invisible laser system, wherein the invisible laser system comprising: an invisible laser light generator for generating invisible laser light; a visible light generator for generating visible light; and an optical path visualization component, wherein the optical path visualization component is arranged in the optical path of the invisible laser light and the optical path of the visible light, and the optical path visualization component comprises a first incident end, a second incident end, and a first outgoing end, the method comprises steps of:
adjusting the invisible laser light generator and the optical path visualization component, such that the invisible laser light is incident on the first incident end, reflected on an interface of the optical path visualization component and output at the first outgoing end; and
adjusting the visible light generator such that the visible light is incident on the second incident end, refracted at the interface, and output at the first outgoing end, and at least part of the visible light is guided to be parallel with the invisible laser light,
wherein the optical path visualization component comprises a polarized beam splitter formed by bonding a first right-angled prism and a second right-angled prism;
wherein the interface is an interface of the ramp of the first right-angled prism and the ramp of the second right-angled prism, the step of adjusting the invisible laser light generator and the optical path visualization component comprises: adjusting the invisible laser light to be vertically incident on the first side of the first right-angled prism, totally reflected on the interface, and vertically emitted on the second side of the first right-angled prism; and
the step of adjusting the visible light generator comprises: adjusting the visible light to be vertically incident on a side of the second right-angled prism opposite to the second side of the first right-angled prism, and vertically and at least partially emitted on the second side of the first right-angled prism.

2. The method according to claim 1, wherein,
the step of adjusting the visible light generator comprises: adjusting the visible light generator such that at least part of the visible light is guided to be coaxial with the invisible laser light.

* * * * *